United States Patent Office
3,660,420
Patented May 2, 1972

3,660,420
PROCESS FOR PREPARING IMIDAZOLE-
BENZYLHISTIDINE DERIVATIVES
Monohar A. Tilak, Indianapolis, Ind., assignor to
Eli Lilly and Company, Indianapolis, Ind.
No Drawing. Filed May 5, 1969, Ser. No. 822,007
Int. Cl. C07d 49/36
U.S. Cl. 260—309
4 Claims

ABSTRACT OF THE DISCLOSURE

Process for preparing im-benzyl-histidine derivatives by treating N-protected histidine with benzyl bromide and an acid scavenger in dimethylformamide or dimethylacetamide.

BACKGROUND OF THE INVENTION

Since peptides are important biological substances, and their isolation from biological systems in a pure state is difficult, for the accumulation of large quantities it is necessary to prepare these materials by synthetic chemical methods. These methods involve as a fundamental step the coupling of two or more amino acids in a manner to form an amido linkage between the molecules:

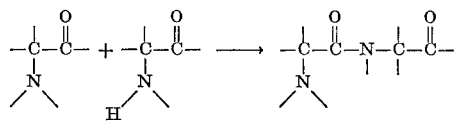

Since amino acids are at least bifunctional, it becomes necessary for the chemist, prior to the above coupling process, to render inactive all functional groups in a given amino acid which are not directly used in the coupling process. If reactive functional groups are allowed to remain unprotected, yields will be lower and purification made more difficult because of the presence of large amounts of unwanted by-products resulting from the reaction of these groups. Several methods are well-known to the chemist for protecting the functional groups of simple amino acids in such a manner that only the desired functional group is available to react when the amido linkage is formed. It is necessary for the protecting group to be easily attached to the amino acid before amide formation and to be readily removed from the resulting peptide, after coupling, without simultaneous rupture of the newly formed amide linkage. Two types of protecting groups are necessary in peptide synthesis: the C-terminal protecting groups, those groups which render the acid portion of the amino acid inactive, as for example, alcohol derivatives, to prepare esters; amine derivatives, to prepare amides; and the like; and the N-terminal protecting groups, those groups which render the amine portion unreactive, such as benzyloxycarbonyl and substituted benzyloxycarbonyl, trityl, tert.-butyloxycarbonyl, allyloxycarbonyl, and the like.

Du Vigneaud and Behrens, J. Biol. 117, 27 (1937), found the benzyl group to be ideally suited for protecting the imidazole portion of histidine during peptide synthesis. The group is easily removed, after incorporation of the histidine fragment into a peptide chain, by catalytic hydrogenolysis or by contacting the peptide with a solution of sodium in liquid ammonia. Since histidine is a vital component of insulin and glucagon, two of the more important biological proteins, and since recent efforts have been made to synthesize these proteins, on a commercial scale, the preparation of im-benzylhistidine has become important.

The method for preparing im-benzyl-L-histidine disclosed by Du Vigneaud and Behrens, loc. cit., involves the use of large amounts of sodium in liquid ammonia, a potentially hazardous procedure which is not adapted to large-scale use.

It is an object of this invention to provide an economical and safe method of preparing im-benzylhistidine.

SUMMARY OF THE INVENTION

This invention relates to a process for preparing benzylimidazoleamino acids. More particularly this invention pertains to a process for preparing im-benzylhistidine.

By the process of this invention, an N-protected histidine or histidine ester is reacted with a benzyl bromide in the presence of an acid scavenger in dimethylformamide or dimethylacetamide, and the resulting fully protected amido-ester is subjected to saponification to yield N-protected-im-benzylhistidine.

DETAILED DESCRIPTION

This invention provides a two step method for the preparation of N-protected-im-benzylhistidine.

In the first step of this invention N-protected histidine or an N-protected histidine ester is alkylated by benzyl bromide in the presence of an amine base in dimethylformamide or dimethylacetamide.

The product of the reaction is an ester of N-protected im-benzylhistidine. If N-protected histidine is used as starting material, the product of the reaction is the N-protected imbenzylhistidine benzyl ester; if an N-protected histidine ester is used, as for example the tert.-butyl ester or the benzhydryl ester, the corresponding tert.-butyl or benzhydryl ester of the N-protected im-benzylhistidine is the product.

The imidazole-benzyl bond is a reasonably stable bond and by the second step of this invention the carboxylic acid can be cleaved from the C-protecting group by saponification of the histidyl ester with I N aqueous sodium hydroxide without danger of scission of the imbenzyl bond. Thus, for example N-carbobenzoxy-im-benzylhistidine benzyl ester can be dissolved in a mixture of 1:1 alcohol-dimethylformamide and saponified by treatment with a slight excess of 1 N sodium hydroxide at room temperature for two hours as hereafter described to yield N-carbobenzoxy-im-benzylhistidine.

In the alkylation reaction which comprises the first step of the method of this invention, it is necessary to use an amine base as an acid scavenger i.e. to remove the acidic products as the reaction progresses. Such non-reactive bases can include highly hindered secondary amines as for example di-tert.-butylamine, dicyclohexylamine, diisopropylamine, or the like; or tertiary amine bases as for example triethylamine, dimethylethylamine, ethyldimethylamine, ethyldiisopropylamine, N - methylpyrrolidine, dimethylaniline, tribenzylamine, and like tertiary amines.

The N-protecting group on the α-position of the amino acid does not participate in the reaction which comprises the process of this invention and can comprise any of the commonly employed protecting groups, such as, for example, benzyloxycarbonyl, 3,5-dimethoxybenzyloxycarbonyl, tert.-butyloxycarbonyl, and enamines derived from ethyl acetoacetate and diethyl malonate, or the like.

Example I

One mole of N-benzyloxycarbonylhistidine was dissolved in an equal volume of dimethylformamide and treated simultaneously with two moles each of benzyl bromide and dicyclohexylamine, each admixed with an equal volume of dimethylformamide. The resulting solution was allowed to react at room temperature for two hours. The dimethylformamide and other volatile materials were removed by distillation in vacuo, and the residue was triturated with ethyl acetate to dissolve the N-protected amino acid derivative. Filtration removed the solid dicyclohexylamine hydrobromide. The ethyl acetate filtrate was evaporated in vacuo, and the residue was dissolved in a 1:1 mixture of dimethylformamide-ethanol. The solution was treated with 1.1 moles of a 1 N aqueous sodium hydroxide and the mixture was stirred slowly for two hours at room temperature. An excess of water was then added, and the product, N-benzyloxycarbonyl-im-benzylhistidine, was precipitated by acidification with acetic acid. M.P. 216–218° C. Yield 33%.

I claim:

1. A method for preparing an N-protected-im-benzylhistidine which comprises treating in dimethylformamide or dimethylacetamide as solvent an N-protected histidine with at least two equivalents each of benzyl bromide and a secondary or tertiary amine base, or a tert-butyl or benzhydryl ester of an N-protected histidine with at least one equivalent each of said benzyl bromide and said amine base, and removing the benzyl, tert-butyl, or benzhydryl ester function from said N-protected-im-benzylhistidine by mild alkaline saponification.

2. The method of claim 1 wherein the amine base is dicyclohexylamine.

3. The method of claim 1 wherein the solvent is dimethylformamide.

4. The method of claim 1 wherein the amine base is dicyclohexylamine and the solvent is dimethylformamide.

References Cited

UNITED STATES PATENTS

| | | | |
|---|---|---|---|
| 3,249,624 | 3/1966 | Karmas | 260—309 |
| 3,399,211 | 8/1968 | Sarett et al. | 260—309 |
| 3,491,105 | 1/1970 | Klink et al. | 260—309 |

FOREIGN PATENTS

| | | | |
|---|---|---|---|
| 660,836 | 9/1965 | Belgium | 260—309 |

OTHER REFERENCES

Du Vigneaud et al., J. Biol. Chem., vol. 117, pp. 27–36 (1937). QP501.J7.

Greenstein et al., Chemistry of the Amino Acids, vol. 2, p. 1067, New York., Wiley, 1961. QP801.A5G7.

Kittila, Dimethylformamide Chemical Uses pp. 10–14 and 68–70, Wilmington, du Pont de Nemours, 1967.

Noller, Chemistry of Organic Compounds, 2nd ed., pp. 156 and 170, Philadelphia, Saunders, 1957. QD253.N65.

NATALIE TROUSOF, Primary Examiner